(12) United States Patent
Norwood et al.

(10) Patent No.: US 11,346,715 B2
(45) Date of Patent: May 31, 2022

(54) STANDARD REFERENCE MATERIAL INTERFACE FOR RAMAN PROBE

(71) Applicant: Kaiser Optical Systems Inc., Ann Arbor, MI (US)

(72) Inventors: Timothy Norwood, Chelsea, MI (US); Joseph B. Slater, Dexter, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 0 days.

(21) Appl. No.: 16/864,786

(22) Filed: May 1, 2020

(65) Prior Publication Data

US 2020/0348173 A1 Nov. 5, 2020

Related U.S. Application Data

(60) Provisional application No. 62/841,421, filed on May 1, 2019.

(51) Int. Cl.
*G01J 3/02* (2006.01)
*G01J 3/42* (2006.01)
*G01J 3/44* (2006.01)

(52) U.S. Cl.
CPC .......... *G01J 3/0297* (2013.01); *G01J 3/0208* (2013.01); *G01J 3/0291* (2013.01); *G01J 3/42* (2013.01); *G01J 3/44* (2013.01); *G01J 2003/423* (2013.01)

(58) Field of Classification Search
None
See application file for complete search history.

(56) References Cited

U.S. PATENT DOCUMENTS

| 5,999,255 A | 12/1999 | Dupée et al. |
| 6,018,389 A * | 1/2000 | Kyle ........................ G01J 3/02 356/301 |

(Continued)

FOREIGN PATENT DOCUMENTS

| DE | 10344784 A1 | 4/2005 |
| EP | 2982967 A1 | 2/2016 |

(Continued)

OTHER PUBLICATIONS

Choquette Steven:"Relative Raman Intensity Calibration Through Fluorescent Glass Standards" In: "Journal of Research of the National Institute of Standards and Technology, vol. 105, No. 4" Jul. 1, 2000 (Jul. 1, 2000), Publisher U.S. Department of Commerce, National Institute of Starndards and Technology, XP055887601.

(Continued)

*Primary Examiner* — Shawn Decenzo
(74) *Attorney, Agent, or Firm* — Kelly J. Smith; Endress+Hauser (USA) Holding Inc.

(57) ABSTRACT

A standard reference material interface for a Raman probe includes a locator including a housing having a first end and a second end, the first end including an attachment portion configured to mate with an attachment portion of the Raman probe. The locator defines a central axis that intersects the first end and the second end. The standard reference material interface also includes a hermetically sealed standard reference material enclosure positioned at the second end of the housing and enclosing a standard reference material. An optical port is positioned within the housing between the Raman probe and the standard reference material relative to the central axis. The optical port includes a window.

10 Claims, 2 Drawing Sheets

(56) References Cited

U.S. PATENT DOCUMENTS

| | | | |
|---|---|---|---|
| 6,198,949 B1* | 3/2001 | Braig | A61B 5/01 250/339.03 |
| 6,348,965 B1 | 2/2002 | Palladino et al. | |
| 6,897,951 B2* | 5/2005 | Womble | G01N 21/276 356/301 |
| 2004/0057038 A1* | 3/2004 | Buchmann | G01N 21/274 356/72 |
| 2004/0160601 A1 | 8/2004 | Womble et al. | |
| 2005/0270536 A1* | 12/2005 | Ludwig | G01J 3/02 356/437 |
| 2006/0007445 A1* | 1/2006 | Van Geen | G01N 21/31 356/409 |
| 2006/0055919 A1* | 3/2006 | Lee | G01N 21/65 356/301 |
| 2007/0125950 A1* | 6/2007 | Wang | G01J 3/0297 250/339.08 |
| 2009/0153850 A1* | 6/2009 | Nielsen | G01N 21/278 356/243.1 |
| 2010/0290042 A1* | 11/2010 | Vakhshoori | G01N 21/65 356/301 |
| 2015/0377769 A1* | 12/2015 | Zeng | G01N 21/278 356/326 |
| 2018/0292266 A1* | 10/2018 | Slater | G01J 5/061 |
| 2020/0116639 A1* | 4/2020 | Owen | G01N 21/65 |

FOREIGN PATENT DOCUMENTS

| | | |
|---|---|---|
| JP | 2010066080 A | 3/2010 |
| JP | 2011112546 A | 6/2011 |
| WO | 2009101418 A1 | 8/2009 |

OTHER PUBLICATIONS

Nist:"Certificate Standards Reference Material 2242", Oct. 22, 2013 (Oct. 22, 2013), XP055887597, Retrieves from the Internet: URL:https://www-s.nist.gov/srmors/certificates/archieves/2242.pdf.

* cited by examiner

STANDARD REFERENCE MATERIAL INTERFACE FOR RAMAN PROBE

CROSS-REFERENCE TO RELATED APPLICATION

The present application is related to and claims the priority benefit of U.S. Provisional Patent Application No. 62/841,421, filed on May 1, 2019, the entire contents of which are incorporated herein by reference.

TECHNICAL FIELD

The present disclosure relates generally to a Raman probe and, more particularly, to a Raman probe interface for housing a standard reference material.

BACKGROUND

Spectroscopy is the study of the interaction between matter and electromagnetic radiation. Raman spectroscopy is a form of vibrational spectroscopy based on the Raman effect, which is the alteration of the frequency and phase of light as it passes through a transparent medium. Essentially, the Raman effect is a change of frequency and wavelength exhibited by some of the light scattered in the medium. This spectroscopic technique is used to detect vibrational, rotational, and other states in a molecular system, capable of discerning the chemical composition of materials. The effect is specific to the molecules which cause it, and so can be used in spectroscopic analysis.

A spectrometer, such as a Raman spectrometer, or probe, is used to carry out these analysis techniques and others, and includes at least an emission source, optical system, and detecting device. Each spectrometer has a unique spectral response, impacted by the spectral modification caused by the optical elements along the light path, such as, for example, lenses, mirrors and/or detectors. Thus, spectrometers for use in spectroscopic analysis should be calibrated, such as by using a spectral reference material. That is, the spectrometer may collect a spectrum of light passing through a spectral reference material having a predetermined, or known, spectral signature to adjust, or correct, the spectral response. This calibration is important for obtaining consistent results from device to device.

The National Institute of Standards and Technology supports accurate and compatible measurements by certifying and providing standard reference materials with well-characterized composition or properties, or both. A detector may detect spectra of the standard reference material, and an electronic component may evaluate the spectra. A correction curve may be determined by comparing the spectra to the predetermined published spectral profile. Careful use and storage of standard reference materials is important because some standard reference materials are sensitive to air, moisture, or contamination. For example, some standard reference materials are susceptible to corrosion in the presence of water or elevated levels of humidity. This may restrict the usefulness of the standard reference material and make it prone to calibration errors.

Accordingly, there remains a need for further contributions in this area of technology.

SUMMARY

According to at least one aspect of the present disclosure, to solve these problems with the current state of the art, the present disclosure teaches an enclosure for housing a spectral reference material for attachment to a Raman probe.

According to another aspect, a standard reference material interface for a Raman probe includes a locator including a housing having a first end and a second end, the first end including an attachment portion configured to mate with an attachment portion of the Raman probe. The locator defines a central axis that intersects the first end and the second end. The standard reference material interface also includes a hermetically sealed standard reference material enclosure positioned at the second end of the housing and enclosing a standard reference material. An optical port is positioned within the housing between the Raman probe and the standard reference material relative to the central axis. The optical port includes a window as part of the hermetic seal of the hermetically sealed standard reference material enclosure.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings.

DETAILED DESCRIPTION

The present disclosure discloses systems and methods for providing a standard reference material interface for a Raman probe. At least one embodiment will now be presented in conjunction with the figures which illustrate the embodiments. It will be understood that no limitation of the scope of this disclosure is thereby intended.

Figure 1:
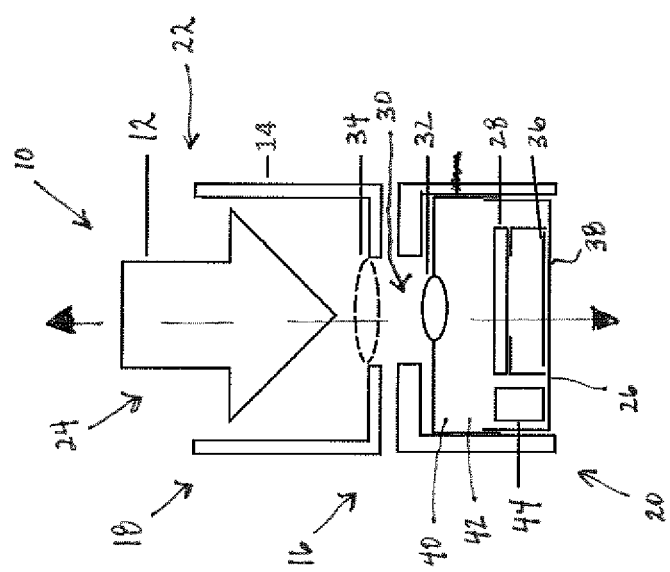
FIG. 1 shows a partial section view of a standard reference material interface for a Raman probe, according to one embodiment of the present disclosure.

FIG. 1 shows a standard reference material interface 10 for a Raman probe 12, such as, for example, a 532 nm Raman spectrometer, or another spectrometer, including, for example, one used in UV/VIS and IR/NIR absorption spectroscopy. The Raman probe 12 is generally used to characterize a sample, such as, for example, a liquid sample. The standard reference material interface 10 may be used to calibrate the Raman probe 12 and includes a locator 14, also referred to herein as an adapter, which includes a housing 16 having a first end 18 and a second end 20. According to some embodiments, the housing 16 may include one or more components. The locator 14 and/or housing 16 define a central axis A intersecting the first end 18 and the second end 20. The first end 18 includes an attachment portion 22 configured to mate with an attachment portion 24 of the Raman probe 12.

The attachment portions 22, 24 may be attached to one another using any of a variety of common attachment methods, which may include the use of threads, screws, rivets, fasteners, a snap fit, a press fit, and the like. After attachment, a portion of the Raman probe 12 may be received within the housing 16. Preferably, the joining of the attachment portions 22, 24 is temporary, or removable, such that the attachment portions 22, 24 can be detached manually.

A hermetically sealed standard reference material enclosure 26 is positioned at the second end 20 of the housing 16 and encloses a standard reference material 28. In some embodiments, the hermetically sealed standard reference material enclosure 26 and the housing 16 may be integral. The standard reference material 28 may include a fluorescent glass, such as, for example, standard reference material 2242. Although a standard reference material is described, it should be appreciated that any sample sensitive to air, moisture, or contamination may be housed within the hermetically sealed standard reference material enclosure 26. More generally, the present disclosure may be applicable to include any conversion of single frequency excitation light into broadband output. This may include liquid fluorescence dyes and quantum dots. The standard reference material 28, or other sample, may be secured relative to the hermetically sealed standard reference material enclosure 26.

An optical port 30 is positioned within the housing 16 between the Raman probe 12 and the standard reference material 28, relative to the central axis A. The optical port 30 may include, or be defined by, one or more openings through the housing 16 and be positioned along the central axis A for transmitting, or permitting transmission of, light from the Raman probe 12 toward the standard reference material 28. The optical port 30 may include a window and/or lens 32 positioned through the hermetically sealed standard reference material enclosure 26 to relay a focal position of the Raman probe 12 toward the standard reference material 28. In addition, the optical port 30 may include a window and/or lens 34 positioned along the central axis A at the first end 18 of the housing 16.

The standard reference material interface 10 may also include a laser absorber 36 positioned within the housing 14 at the second end 20 thereof or, more specifically, within the hermetically sealed standard reference material enclosure 26, and between the standard reference material 28 and an end wall 38 of the hermetically sealed standard reference material enclosure 26, relative to the central axis A. The end wall 38 may at least partially define an end wall of the housing 14. According to some embodiments, the standard reference material 28, which may be a surface absorber, such as an Aktar film, and the laser absorber 36 may be mechanically spaced from one another. According to other embodiments, the laser absorber 36 may be a bulk absorber optically contacting the standard reference material 28.

The hermetically sealed standard reference material enclosure 26 may contain an inert gas 40, such as a noble gas 42 (e.g., helium, neon, argon, krypton, xenon, and radon), or a vacuum to provide a constant environment and reduce any degradation of the contents of the hermetically sealed standard reference material enclosure 26. The hermetically sealed standard reference material enclosure 26 may also house a desiccant 44, or another drying agent.

Figure 2:
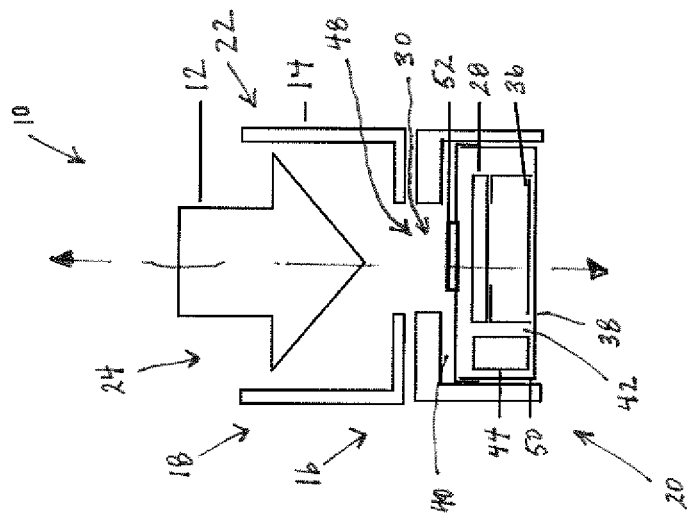
FIG. 2 shows a partial section view of an alternative configuration of the standard reference material interface of FIG. 1.

Turning now to FIG. 2, an alternative configuration of the standard reference material interface 10 is shown. According to the present embodiment, the window and/or lens 34 of FIG. 1 is absent. However, an opening 48 remains. A hermetically sealed standard reference material enclosure 50 is provided and includes a window and/or lens 52, which may be different than the window and/or lens 32 of FIG. 1, positioned therethrough. In addition, a size, or volume, of the hermetically sealed standard reference material enclosure 62 may vary, changing a location of the window and/or lens 52 relative to the standard reference material 28.

Figure 4:
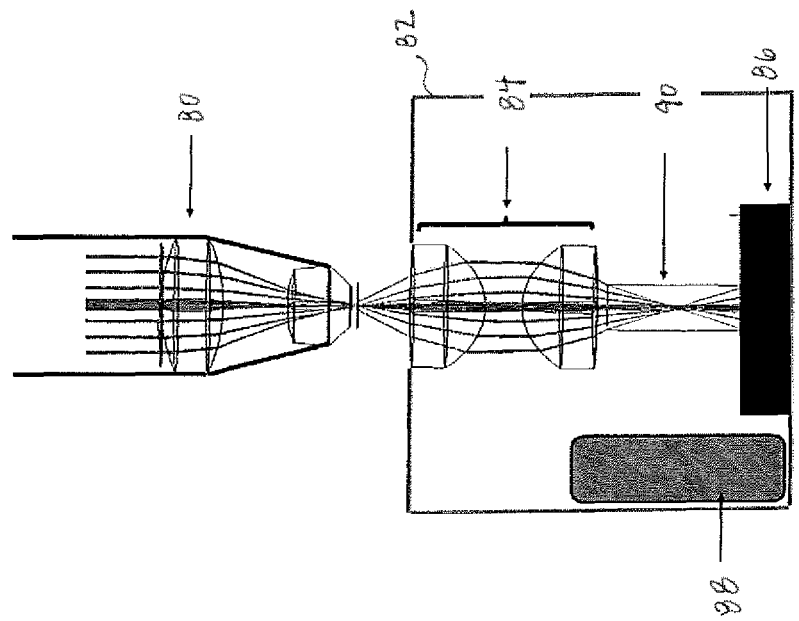
FIG. 4 shows a partial section view of the Raman probe and the hermetically sealed standard reference material enclosure of FIG. 3, including a second embodiment of the standard reference material.
Figure 3:
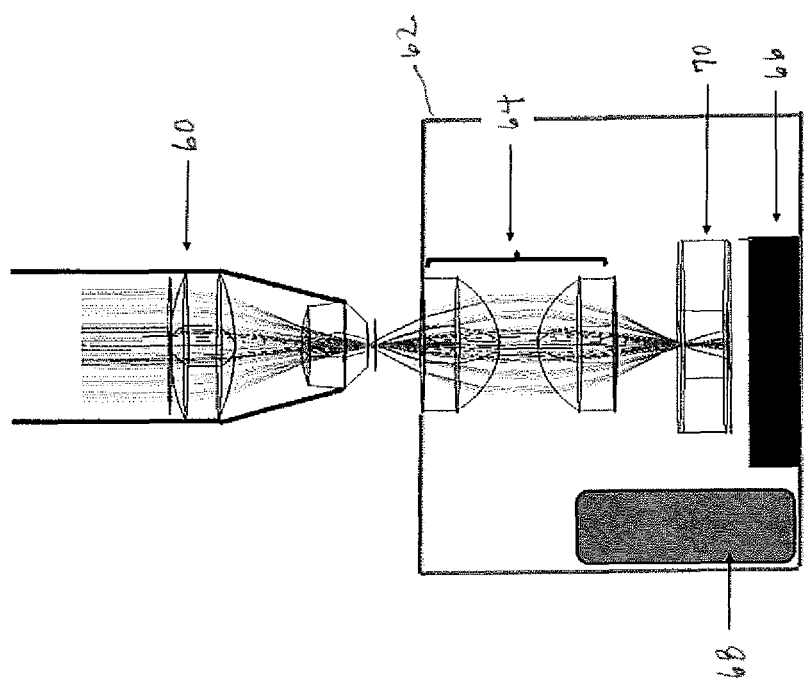
FIG. 3 shows a partial section view of a Raman probe and a hermetically sealed standard reference material enclosure including a first embodiment of a standard reference material.

According to FIGS. 3 and 4, which are similar to the embodiments of FIGS. 1 and 2, alternative standard reference materials are shown. Although the standard reference materials may vary in a number of aspects, FIGS. 3 and 4 illustrate a variance in the orientation of the standard reference materials. FIG. 3 generally includes a Raman probe 60, and a hermetically sealed standard reference material enclosure 62 including a window and/or lens 64, a laser absorber 66, and a desiccant 68. Also shown is a flat standard reference material 70, having a perpendicular orientation relative to an axis $A_1$. FIG. 4 also generally includes a Raman probe 80, and a hermetically sealed standard reference material enclosure 82 housing a window and/or lens 84, a laser absorber 86, and a desiccant 88. Also shown is a standard reference material 90, having a vertical orientation relative to the axis $A_1$, also referred to herein as a mixing rod. The flat standard reference material 70 and the mixing rod standard reference material 90 may be made from similar materials; however, the optical arrangement may be functionally different. The usage may be less alignment sensitive with higher signal levels. Configurations of the hermetically sealed standard reference material enclosures 62, 82 may change accordingly.

While various embodiments have been described in considerable detail herein, the embodiments are merely offered by way of non-limiting examples of the disclosure described herein. It will therefore be understood that various changes and modifications may be made, and equivalents may be substituted for elements and steps thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Such sequences may be varied and still remain within the scope of the present disclosure. Therefore, the particular order of the steps disclosed herein should not be construed as limitations of the present disclosure.

What is claimed is:

1. A standard reference material interface for a Raman probe, comprising:
    a locator including a hermetically sealed housing, which defines a hermetically sealed enclosure, having a first end and a second end, the first end including an attachment portion configured to mate with an attachment portion of the Raman probe, the locator defining a central axis, and the second end closed, wherein the central axis intersects the first end and the second end;
    a standard reference material disposed within the housing at or near the second end of the housing; and
    an optical port into the housing disposed between the first end and the standard reference material relative to the central axis, the optical port including one or more lenses optically configured to relay a focal position of the Raman probe into the standard reference material.

2. The standard reference material interface of claim 1, wherein the standard reference material includes a fluorescent glass.

3. The standard reference material interface of claim 1, wherein the optical port further includes a window.

4. The standard reference material interface of claim 1, further comprising a laser absorber positioned within the housing at the second end thereof between the standard reference material and an end wall of the housing.

5. The standard reference material interface of claim 4, wherein the laser absorber is positioned between the standard reference material and the end wall relative to the central axis.

6. The standard reference material interface of claim 1, wherein the hermetically sealed enclosure contains a gas.

7. The standard reference material interface of claim 6, wherein the hermetically sealed contains a noble gas.

8. The standard reference material interface of claim 1, further comprising a desiccant disposed within the housing.

9. The standard reference material interface of claim 1, wherein the standard reference material includes a reference material enclosure disposed within the housing and enclosing the standard reference material.

10. The standard reference material interface of claim 1, wherein the one or more lenses includes opposing convex lenses optically configured to alternately collimate and focus light to and from the Raman probe and the standard reference material.

* * * * *